C. W. SAALBURG.
METHOD OF PRINTING.
APPLICATION FILED APR. 29, 1916. RENEWED SEPT. 28, 1917.
1,271,949.
Patented July 9, 1918.
2 SHEETS—SHEET 1.
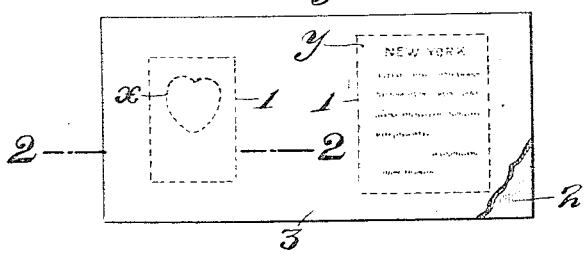
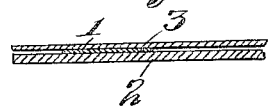
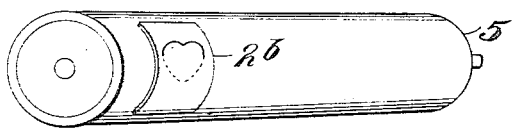
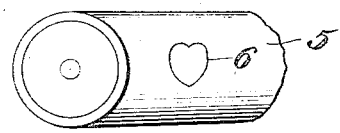
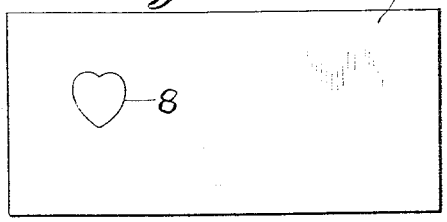
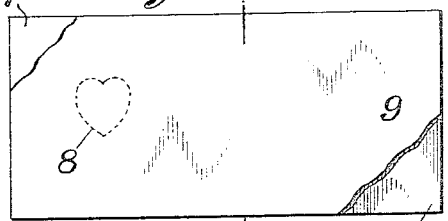
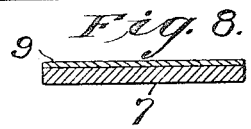
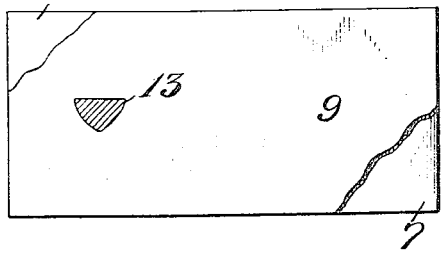
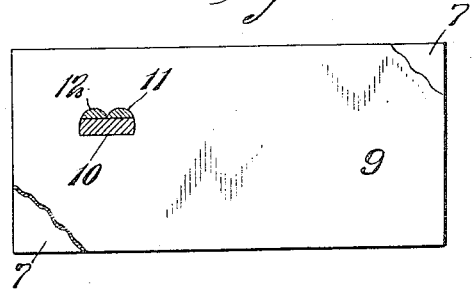

C. W. SAALBURG.
METHOD OF PRINTING.
APPLICATION FILED APR. 29, 1916. RENEWED SEPT. 28, 1917.

1,271,949.

Patented July 9, 1918.
2 SHEETS—SHEET 2.

Charles W. Saalburg INVENTOR
BY Edward P. Beach ATTORNEY

UNITED STATES PATENT OFFICE.

CHARLES W. SAALBURG, OF RICHMOND HILL, NEW YORK, ASSIGNOR TO MULTICOLOR INTAGLIO PRESS COMPANY, OF NEW YORK, N. Y., A CORPORATION OF DELAWARE.

METHOD OF PRINTING.

1,271,949.  Specification of Letters Patent.  Patented July 9, 1918.

Application filed April 29, 1916, Serial No. 94,332. Renewed September 28, 1917. Serial No. 193,839.

*To all whom it may concern:*

Be it known that I, CHARLES W. SAALBURG, a citizen of the United States, residing at Richmond Hill, in the county of Queens and State of New York, have invented certain new and useful Improvements in Methods of Printing, of which the following is a specification.

This invention is an improvement in the art of printing. The ultimate object of the invention is the production of etched intaglio printing rolls or plates in short time and a low cost, so that superimposed colors having a marked brilliancy of effect may be printed in a minimum time and at very low expense as compared with present methods.

Another object of the invention is to make the recesses, pits, or wells for holding ink or color in the printing surfaces of printing rolls or plates, of uniform depth and of sufficient depth so that the printing surfaces will not comprise shallow pit walls which have been found to wear away so speedily that frequently in the printing of a large edition or job the light shading became obliterated in consequence of the wearing away and destruction of the shallower pits which hold the ink for the light shading;
and also to make such recesses, pits or wells of varying areas corresponding to the shading areas desired for perfection of the color values in the final product. Such rolls or plates are an important economical feature of this invention.

One purpose of this invention for example is to make it economically practicable to print newspaper supplements in superimposed colors and with high artistic effects, speedily after the occurrence of any event which it is desired pictorially to illustrate in colors, and especially so to produce etched intaglio rolls for use in either a multicolor web-perfecting or a sheet fed printing press, such for example as shown in the application of Patrick H. McGiehan Serial No. 100,183, filed May 27, 1916.

To print multicolor photogravure on a perfecting web press for newspapers or where it is necessary to make several copper roll etchings quickly, is not commercially possible at the present time by the ordinary well-known negative and positive photographic methods of color separation;
or otherwise. By color separation is meant
that the original color picture or scene is
placed before the camera, and by what are
termed color filters that are placed between
the lens and a sensitized dry plate, all the
yellow that is in the picture is exposed on
one dry plate, separate color filters being
used for the reds, blues and other colors,
and the dry plates severally containing all
the different colors of the original.

In the accompanying drawings forming a part hereof and illustrating my present invention, in part diagrammatically, Figure 1 is a top plan view of a superimposed, transparent mount, two photographic
positives, and a sheet of photographically
sensitized carbon paper or tissue, the photographic positives being between the mount
and carbon tissue and indicated in dotted
lines. In one of the positives I have indicated in dotted lines a heart-shaped figure which is to be considered as the photographic image of any kind of a picture or
representation. In the other positive I have
indicated in dotted lines printed matter
which is also to be understood as the photographic image of the tissue.

In the other drawings I have omitted all
showing of the positive having the printed
matter, because indication of the positive
containing the heart-shaped figure indicative of a picture image is sufficient for an
understanding of the invention.

Fig. 2 is a cross-section corresponding to
the line 2—2 of Fig. 1.

Fig. 3 is a cross-section of a screen of any
desired kind made of transparent material
and of an initial carbon print in flatwise assemblage.

Fig. 4 is a view indicating an etchable
copper roll on the surface of which the carbon screen print has been transferred; and Fig. 5 is a view of the roll in an etched
condition, the etching showing the heart-shaped figure indicative of a picture; and
the etched roll here shown is hereinafter
called the key roll.

Fig. 6 is a plan view of a key sheet of
transparent material such as celluloid, for
example, on which the figure shown on the
key roll (Fig. 5) has been printed with light
blue ink for example.

Fig. 7 is a plan view of a superimposed assemblage of a key-sheet covered on its printed side with a transparent reproduction sheet; and Fig. 8 is a cross-section of such assemblage at line 8—8 of Fig. 7.

Fig. 9 is a top plan view of a superimposed assemblage of a key-sheet with a reproduction sheet thereon of transparent material such as celluloid, and on which has been art-worked a portion of the underlying picture indicated by the heart-shaped figure referred to, such portion being assumed to be in one of four colors,—black, red, yellow and blue, commonly used in four-color printing.

Fig. 10 is a view similar to Fig. 9 but in which the art-worked portions of the heart-shaped figure are art-worked in different colors.

Figure 11:
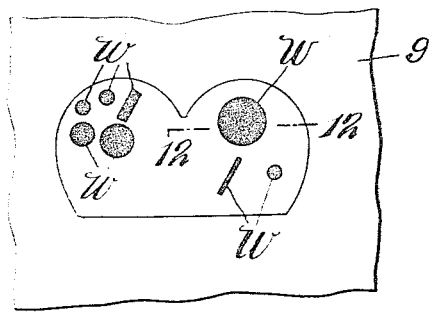

Fig. 11 is an illustration of the art-worked face of reproduction sheet wherein the color deposited in the art-working is graphically and exaggeratedly indicated by black dots of varying sizes, and two rectangular black figurations. These round and rectangular figurations indicate some of the many piles or thicknesses of color which are laid on the surface of a reproduction sheet and which correspond to the dots, grains, stipple or other artwork whereby color and shade values are effected in the art-work drawing.

Figure 12:

Fig. 12 is a cross-section at line 12—12 of Fig. 11, and exaggeratedly indicates one of the many piles of color deposited on the reproduction sheet when the art-work drawing thereon is made.

Figure 13:
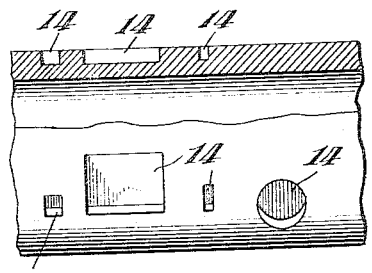

Fig. 13 is a partial view of a printing roll which has been etched and wherein the ink-receiving spaces, pits, or wells, are also shown of exaggeratedly varying areas, but of uniform depth, these being due to the varying areas and uniform height or depth of the deposited color shown in the art-working illustrated by Fig. 11.

Figure 14:
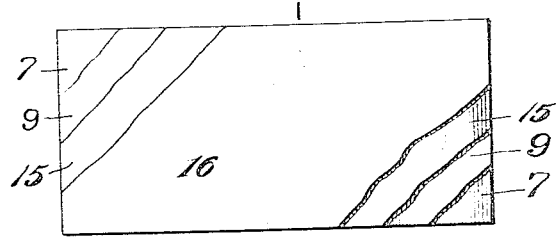
Figure 15:
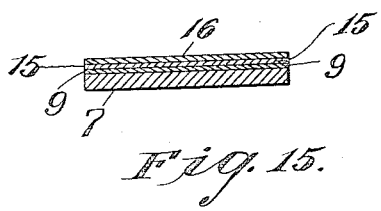

Fig. 14 is a top plan view of a transparent key sheet and, reading upwardly from the key sheet which is at the bottom of the stack, of an art-worked reproduction sheet, here used as a photographic positive, of a sheet of photographically sensitized carbon paper or tissue and of a transparent screen of any suitable configuration; and Fig. 15 is a cross-sectional view of the assemblage shown in Fig. 14 at line 15—15 thereof.

Figure 16:
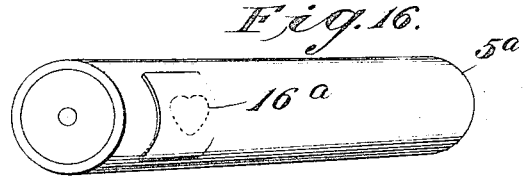
Figure 17:
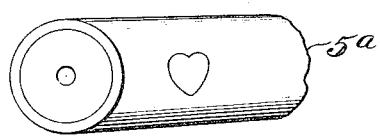

Fig. 16 is a view of a printing roll having transferred to its surface the final carbon tissue print; and Fig. 17 is a view of the same print roll, etched.

Figure 18:
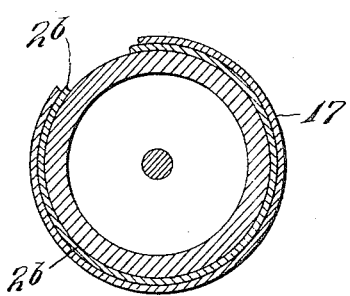

Fig. 18 is a cross-section of a printing roll to be etched in assemblage with a final carbon tissue print assumed to have the image of the picture and overlaid with a carbon screen print.

When, in such older processes, several duplicates of the subject were to be placed on one roll to be duplicated on all the other rolls, I made on glass as many duplicates of the color negatives and color positives as were required to complete the rolls; and then cut out a large piece of sensitized carbon paper and placed in a photographic printing frame all the positives with the large carbon sheet over the positives under good pressure, and took the exposures for the various colors. If the work required four colors for example, I made a set of four colors, black, yellow, red, and blue positives. Such work involved a long operation, and particularly so when each color positive had to be retouched separately. One of the greatest objections, however, encountered, was non-uniformity in the thickness of the glass dry plates obtainable in the public market. My experience has been that when these separate glass positives are placed in a printing frame and the thin carbon sensitized paper is pressed over the glass positives which are of varying thicknesses, non-uniformity of print occurs on the carbon paper, and that such objectionable non-uniformity is repeated on each color form so that when the large carbon print is transferred on a copper plate or roll, a difference of registration in all the colors is brought about by the inaccuracies arising from the non-uniform thicknesses of the glass positives and the open spaces between the glass mounts.

Photographic color separations are usually made one at a time so that the above conditions cannot be readily changed by making an exposure on a single sheet of all the pictures that are required to be etched on one roll. Therefore it has been necessary heretofore to use separate glass plate negatives. Setting up these separate negatives, that is mounting them on a large piece of plate glass used as a transparent mount, is expensive and inaccurate, and involves slow operation for such transparent negatives have to be mounted by eye through the thickness of a glass positive and when the operation was repeated four times for example, once for each set of four colors, final correct registration was very uncertain. If they do not register on the final etching there is no way to rectify the mistakes and the copper roll has to be turned down for another etching.

For superimposed multicolor intaglio printing where several color rolls are to be used for printing whether on a sheet or on a traveling web, a rapid, inexpensive and accurate process must be devised to produce the final result, particularly for newspaper editions.

In this connection I may say that flat plates, or curved plates, or flat bendable plates of etchable material, are deemed equivalents of the copper rolls mentioned.

One important feature of my invention is to make the final carbon print to be transferred to the rolls or plates as hereinafter described, from a carbon print in flatwise assemblage with a grain, dot, or stipple screen, and not with a line screen, in order to avoid moiré antique or checkerboard effects in the printed product, unless the carbon print is made from a half-tone, dot or grain or stipple positive, in which case a line screen may be used with the carbon print without producing moiré antique effects if the lines of the line screen do not intersect the dots, grains or stipple.

For the production of etched intaglio printing rolls or plates according to my present invention, my procedure, depending on the nature of the subject, is as follows:

First. When it is desired to produce etched rolls or plates for the printing of pictures in arbitrary colors,—as distinguished from the coloration given by an artist to the picture which it is intended to reproduce.

1. I place either one or more photographic positives 1 on a suitable transparent mount 2 and place a sheet 3 of photographically sensitized carbon paper having the usual gelatin or like content, over the positive or positives (Figs. 1 and 2), and by exposure in a printing frame make an initial carbon print from the positive or positives.

2. I then assemble such initial carbon print 2ª in flatwise contact with a grain, dot, stipple or line 4 screen of transparent material (Fig. 3), and expose the assembled print and screen in a printing frame.

3. I then transfer the latter, or what I will call the carbon-screen print 2ᵇ, just made, to a metal roll 5 or plate (Fig. 4), and develop and etch the roll or plate to form a key roll or a key plate. Fig. 5 shows the etching on the roll at 6.

4. From such key roll 5 or key plate, placed in a printing press, I print on a series of transparent sheets 7 which are preferably of celluloid, as many different impressions as are required for the additional printing rolls or printing plates required to be etched, according to the number of colors to be printed. Thus I form a series of printed transparent key sheets 7. These key sheets are printed 8 with a light blue or other ink or compound which will not print when in a later step the key plates are exposed in connection with sensitized carbon paper and a reproduction sheet and a screen.

5. I then cover each key sheet 7 with a transparent reproduction sheet 9, preferably of celluloid, keeping each superimposed key sheet and reproduction sheet in fixed relation one to the other, and reproduce in opaque ink or material from the underlying key sheet on the outward surface of the reproduction sheet, by means of inking up tinting films or other suitable process, means or procedure, the part or parts of the underlying key sheet which corresponds to the color areas 10, 11, 12, for examples, that are to be subsequently etched on the rolls or plates. There are many ways in which an artist can draw, paint, crayon or transfer ink onto the reproduction sheets preparatory for final results, art-working as many of such sheets as may be required. Figs. 7 and 8 show one of the key sheets 7 assembled with one of the reproduction sheets 9 art-worked in different colors 10, 11 and 12, and in Fig. 10 another portion of the picture is art-worked in a fourth color 13.

The reproduced part or parts are in opaque dots, grains, rub tints, stipple, or line, and the outward surface of the reproduction sheet if preferred may be grained like a lithographic stone and pigment placed thereon as on stone. The dots, grains, stipple or other art work W on the reproduction sheet, are of varying areas (Fig. 11) corresponding to the shading to be used for the color values in the finally printed product, and they are also of substantially equal density, as shown in solid black in Fig. 11, in order to effect finally a uniform depth of etching,—that is to say, a substantially uniform but sufficient depth of the ink-holding recesses 14 which will be of varying areas (Fig. 12) in consequence of the varying areas of the dots, grains, stipples and the like of the art work W.

Inasmuch as each reproduction sheet is fixed in its superimposed position on a key sheet during the performance of the art work on the reproduction sheet, it follows that registration of the work done on the reproduction sheet may be, according to the skill of the workman, in absolute registration with the picture on the underlying key sheet.

6. I next take each set of assembled key sheets 7 and reproduction sheets 9 in their said fixed relations one to another, and assemble each set as a positive with a sheet of photographically sensitized carbon paper 15 having the usual gelatin or similar content, and also with a suitable transparent screen 16, and make an exposure of such assemblage, which comprises a key sheet having non-printing delineation, an art-worked reproduction sheet, a sheet of sensitized carbon paper, and the screen; and after such exposure of such assemblage in a printing frame, I transfer the final carbon print 16ª produced by this last exposure to an etchable roll 5ª or plate, as of copper, and then etch the roll or plate.

Whenever desired, one may use instead of a single (Figs. 15 and 16) transparent reproduction sheet, as many smaller sheets, one for each figure or picture on the key plate, as desired, and such smaller or individual reproduction plates may be stuck in place on a sheet used as a mount. That is, where large size pages are required and involve the use of large size sheets of sensitized carbon paper or tissue, it will sometimes be preferable to use the smaller sheets referred to, one for each figure or picture, on a sheet mount. A celluloid sheet such as used for the key sheet above mentioned may be used as the mount for such series of carbon tissue prints, as sufficiently illustrated in Fig. 1.

If it is desired to give a fine tooth or grain to the outward surface of the reproduction sheet or sheets, such tooth may be effected by washing the surface with amyl acetate, for example.

Preferably the key sheets 7 are made of rather stiff transparent celluloid to insure stability and to insure against stretching or shrinkage, and preferably the reproduction sheet or sheets 9 are made of thinner transparent celluloid, and made quite thin in fact, so that very accurate reproduction of the underlying subject or subjects is facilitated. Thin reproduction sheets may be effectively and uniformly pressed home in the printing frame on the key plates. The light blue or other suitable non-printing delineation on the key plates prevents such delineation or picture from printing simultaneously with the art work in the final assemblage.

The above procedure is cheap, accurate and rapid, and does away entirely with photographic color negatives and positives. By reason of every dot, grain, stipple or the like being of the same density of pigment, the etching acid will bite through the dots, grains, stipple or other deposit in an equal time, and therefore bite into the copper in the same time and form ink-receiving recesses of equal depth whose areas will be severally in accordance with the areas of the dots, grains, stipples and the like. This is a fact, as I find in actual experience, and secures working durability to the printing rolls or plates.

7. There is an additional step of a useful nature, but which is not absolutely essential though frequently desirable, as follows (see Fig. 17): I may make the initial carbon paper exposure of the positive, transfer the resulting carbon print film $2^b$ to the roll or plate, and dry; and subsequently take a sensitized carbon paper exposure of the screen which it is desired to use and transfer such second resultant film 17 over the first dried film, developing the latter film and drying. Thus there will be two films for acid penetration instead of one, and this assemblage effects in the etching greater depth and strength, and effects greater detail in the printed product. The superimposed film also covers up any small specks or defects in the underlying film which would cause what are commonly called devils in the etched product. The exterior film covers and obliterates the defects of the underlying film. The procedure just indicated is especially desirable in warm and humid weather when the films are apt to decompose.

The above procedure is especially useful when a full page illustration, for example, is required, as generally for magazine covers, and often in making large prints in newspaper supplements; or when a large sheet is to be printed with a plurality of pictures.

Second. When it is desired to produce etched printing rolls or plates for the printing of pictures in the same or approximately the same colors, shades and tones that the artist has used in the picture to be reproduced, then one may economically avail of lithography as a step in the production of positives for use in the first step in the above-described procedure,—that is, for the production of the initial carbon print.

Such use of lithography is especially adapted to enable the artist to see on paper his finished color results from a subject on a lithographic stone and before he begins to etch the rolls or plates. This is a matter of practical economy. The present use of lithography as a step in my invention eliminates the necessity of using photographic negatives and positives, and color separation mistakes cannot happen because the operator will have a proof on paper before the etching operation is started.

For instance, a color subject is given for reproduction, and instead of being photographed by color separation on negatives and positives, or otherwise photographed, the lithographer makes as many lithographic drawings of the subject as may be required by the crayon, half-tone, stipple or any other appropriate means or medium. He then makes a combination proof on paper of the several colors. Thereupon, as another step, one may take a series of sheets of transparent celluloid or other suitable material, one for each color, and make thereon a lithographic transfer from the stone with black pigment. If the work requires, for instance, four duplicates, he makes four transfers on separate sheets of celluloid, one for each of the four colors, and each such sheet is a positive suitable for use in printing the initial carbon print referred to above. Thus the requisite positives are produced without the aid of photography. The advantage which this lithographic step involves as compared with the photographic separation process is, in addition to its being superior for duplicating more cheaply and quickly, that a photogravure etched from a dry plate positive is made by etching different tones of the positive, and that it takes great skill to do such work; it being impossible unless by accident to etch two photographic positives of the same subject at different times and get the same tones. In fact the difference is very marked, and the rolls or plates must be manipulated to a great extent after the main etching work is completed. This is especially true with reference to multicolor work. What I may call my lithographic positives above referred to, and which are transfers from lithographic stones with black ink on celluloid or other transparent material, have the advantage that every dot, tone or tint on the lithographic stone is of the same density of color and the picture is made by use of different sizes of the black dots, grains, stipples, lines or the like, and not by flow of smooth tones as in a dry plate positive.

Generally stated, the chief improvement is observed while the etching is in progress. A gelatin carbon print made from a dry plate positive has to be etched by different strengths of a suitable acid such as chlorid of iron solution. Penetration of different thicknesses of the gelatin print is uncertain and dependent upon skill and understanding of the temperature and humidity conditions, but when all the tones on a gelatin print are produced with dots of equal density, the picture being made of dots, grains, stipple or the like of varying areas, then all the parts of the film are attacked at once on application of a single acid of suitable strength, and the etching is automatically effected without the constant observation and use of several different strengths of acids as heretofore; and moreover each etching, if the same time is given for the automatic operation with the single acid, will be substantially identical with every other etching of the same series.

The use of a key plate printed or impressed with a picture made in light blue ink or other material which will not print in the printing of the final sensitized carbon paper print, is not an absolute essential because it is not absolutely essential that the key sheet be used in making that final carbon print which is to be transferred to an etchable roll or plate. However, if the key sheet and reproduction sheet be disassembled, there will be undesirable waste of time and labor and inconvenience when and where quick and most economic results are wanted; and if the key sheet happens in any given case to constitute a mount for a plurality of reproduction sheets, then in case of disassemblage much labor and difficulty will be necessary in order to arrange the plurality of reproduction sheets symmetrically and for the exact registration required in an assemblage of a plurality of reproduction sheets with a carbon paper sheet, with or without a screen for the final print. Thus although the non-printing key-sheet is a dead or inactive element in the final printing assemblage, yet it always serves a useful purpose in saving time and promoting economy and convenience, and in many instances will be almost a necessity.

It is not an absolute essential that the final carbon print be made in assemblage with a screen, but the final carbon screen print is desirable for the best results.

In addition to the key roll or plate to be etched, there will be as many other rolls or plates to be etched as there are colored inks or the like to be used. The art-work dots, grains, stipple and the like on the reproduction sheets may be generically referred to as patches of varying areas and substantially equal density. An important result of the use of such patches is that the carbon print having a gelatin or similar content printed by exposure to light from such artworked sheet, when transferred to an etchable roll or plate, can be immersed in a bath of a suitable etching acid which bites through the patches of equal density but of varying areas in the same period of time, so that the acid bites into and forms in the etchable surface the ink-holding recesses of varying areas and of equal depth. The etching operation is thus automatic. But of course the etching may be done in whole or in part by manual application of the acid in the usual way, if so desired.

I have hereinbefore referred to screens. The color separation operation which is avoided by my invention, involves the use of cameras provided with so-called color screens. Such screens are not used. I have referred to inking-up films. Some varieties of such films are commonly known as Ben Day films. I have referred to other screens as line screens. These are ordinarily of glass and ruled with lines in various directions one to another. I have also hereinbefore referred to devils. These devils may be caused by humidity or conditions of temperature, or even by imperfections in the gelatin film itself. At any rate if the acid gets into such minute openings in the film it will bite into the etchable surface and form ink-holding recesses where they are not wanted. By putting the carbon screen print over the carbon negative print, all mutilation of the photographic image on the under photographic negative tissue is avoided and at the same time devils are avoided, and also, and what is particularly important in textile printing, I get an increased depth of tissue for etching and thereby obtain an increase of depth of the ink-holding holes or recesses, which increase of depth as compared with the depth obtainable by etching through the negative tissue only, is a very positive advantage, especially in textile printing, because a greater quantity of ink is had on the doctored roll than would otherwise be the case, and such increase of depth of ink enables the printing-couple pressure better to force the ink through the fabric from the front to the rear side so that the printed figure will appear on the back side of the goods as is required in many lines of printed textiles.

The part or parts of the roll or plate that are not to be etched are coated with an acid-resist material which prevents the etching acid from attacking such parts.

In the textile printing art, the artists who draw the original designs for engraved rolls made by the pantograph machine, customarily make what are called allowances; that is, spaces between different coloration parts, to allow for the spreading or springing of the colors used in printing. By my invention the difficulties arising from allowances are overcome because of the great multiplicity of cells in the etched roll or plate instead of the non-cellular spaces and deep continuous cavities inherent in engraved rolls. Another advantage of my invention, in its application to textile printing, lies in the fact that when a given pattern drawn by an artist has to be repeated with pattern figuration joined in order to cover a roll or plate with a continuous pattern, my repeats are readily made by reversing some of the thin celluloid positive reproduction sheets which are thin enough for use as printable positives whichever side is against the sensitized carbon sheet. In the case of glass positives, the glass is so thick as to throw the exposure off on the carbon paper if it were attempted to print from the back surface of such glass positive.

I do not herein claim the use of the exterior film for obliterating defects of the underlying film and the avoidance of devils because the same forms the subject-matter of my pending application Serial No. 151,169, filed February 27, 1917.

What I claim is:

1. The process of making etched printing rolls or plates for multicolor printing, consisting in making, without use of color separation screens, a carbon print having a gelatin or like content, of a picture to be reproduced; in assembling such initial print flatwise with a transparent screen and exposing such assemblage to light; in transferring such screen print to an etchable roll or plate and etching the same to form a key roll or key plate; in printing from such key roll or key plate a series of impressions on transparent sheets, one impression for every additional color roll or color plate required, and thereby making a series of transparent key sheets; in fixedly and flatwise assembling each such key sheet with a transparent reproduction sheet; in art-working in opaque patches of varying areas and equal density on each reproduction sheet the part or parts of the underlying key sheet that are correspondent to the particular color required in a corresponding part or parts of the reproduction to be printed in superimposed colors; in assembling each such art-worked transparent reproduction sheet with a sheet of sensitized carbon paper having a gelatin or like content and exposing such assemblage to light; in transferring each carbon print last-named to an etchable roll or plate; and in subjecting each such roll or plate and the transferred carbon print on it to a suitable acid and thereby producing in the printing surface of the roll or plate, ink-holding recesses of varying areas and of substantially uniform depth.

2. The process of making etched printing rolls or plates for multicolor printing, consisting in making, without use of color separation screens, a carbon print having a gelatin or like content, of a picture to be reproduced; in assembling such initial print flatwise with a transparent screen and exposing the assemblage to light; in transferring such screen print to an etchable roll or plate and etching the same to form a key roll or key plate; in printing from such key roll or key plate with an ink or the like that will not print in a subsequent light-printing operation, a series of impressions on transparent sheets, one impression for every additional color roll or color plate required, and thereby making a series of transparent key sheets; in fixedly and flatwise assembling each such key sheet with a transparent reproduction sheet; in art-working in opaque patches of varying areas and equal density on each reproduction sheet the part or parts of the underlying key sheet that are correspondent to the particular color required in a corresponding part or parts of the reproduction to be printed in superimposed colors; in assembling each key sheet with one of the art-worked transparent reproduction sheets and with a sheet of sensitized carbon paper having a gelatin or like content, and exposing such assemblage to light; in transferring each carbon print, last made, to an etchable roll or plate; and in subjecting each such roll or plate and the transferred carbon print on it to a suitable acid and thereby producing in the printing surface of the roll or plate ink-holding recesses of varying areas and of substantially uniform depth.

3. The process of making etched printing rolls or plates for multicolor printing, consisting in making, without use of color separation screens, a carbon print having a gelatin or like content of a picture to be reproduced; in assembling such initial carbon print flatwise with a transparent screen and exposing the assemblage to light; in transferring such screen print to an etchable roll or plate and etching the same to form a key roll or key plate; in printing from such key roll or key plate a series of impressions on transparent sheets, one impression for every additional color roll or color plate required and thereby making a series of transparent key sheets; in fixedly and flatwise assembling each such key sheet with a transparent reproduction sheet; in art-working in opaque patches of varying areas and equal density on each reproduction sheet the part or parts of the underlying key sheet correspondent to the particular color required in a corresponding part or parts of the reproduction to be printed in superimposed colors; in assembling each such art-worked transparent reproduction sheet and its underlying key sheet in fixed relation thereto, with a sheet of sensitized carbon paper having a gelatin or like content and also with a screen and exposing such assemblage to light; in transferring each carbon print last-made to an etchable roll or plate; and in subjecting each such roll or plate and the transferred carbon print on it to a suitable acid and thereby producing on the printing surface of the roll or plates ink-holding recesses of varying areas and of substantially uniform depth.

4. The process of making etched printing rolls or plates for multicolor printing, consisting in making art-work in patches of varying areas and substantially equal densities on a transparent sheet; in making a carbon print from such transparent sheet; in transferring such print to an etchable roll or plate; and in subjecting the roll or plate with the transferred film on it to an acid bath and thereby biting into the roll or plate ink-holding recesses of varying areas and substantially equal depths.

5. As an improvement in the art of printing from a series of etched rolls or plates each having a plurality of etchings that are required to be registered accurately one with another in the press printing operation, a process consisting in placing a plurality of photographic carbon tissue positives on a mount which is detachable from the positives; in transferring such positives from the detachable mount to a press printing surface to be etched; in etching such surface and thereby forming a key press printing surface having a plurality of etched portions; in making a press printed impression on a transparent sheet from the key press printing surface in an ink which will not print photographically, in order to form a key sheet; in assembling such key sheet with a transparent reproduction sheet; in reproducing on the reproduction sheet such part or parts of the representations on the underlying key sheets as may be desired; in assembling the so-worked reproduction sheet with a sheet of sensitized carbon tissue; in exposing such assemblage in a photographic printing frame and making a photographic carbon tissue print; in transferring such last carbon tissue print to another press printing surface to be etched; and in etching such second surface; whereby two etched press printing surfaces each having a plurality of etched portions are produced, the corresponding etched portions of the two press printing surfaces being in exact relatively registering positions one to another.

6. As an improvement in the art of printing from a series of etched rolls or plates each having a plurality of etchings that are to be registered one with another in a press printing operation, a process consisting in placing a plurality of photographic carbon tissue positives on a mount detachable from the positives; in transferring such positives from the detachable mount to a press printing surface to be etched; in etching such surface and thereby forming a key press printing surface; in making a press printed impression on a transparent sheet from the key press printing surface in an ink which will not print photographically, in order to form a key sheet; in assembling such key sheet with a transparent reproduction sheet; in reproducing on the reproduction sheet such part or parts of the reproductions on the underlying key sheet as may be desired; in assembling the so-treated reproduction sheet with a plurality of sensitized carbon tissue sheets; in exposing such assemblage in a photographic printing frame and making a series of photographic carbon tissue prints; in placing these several prints on a mount in positions correspondent to the positions of the positives on the first mount; in transferring the last series of photographic carbon tissue prints from their mount to a second press printing surface to be etched; and in etching such second surface; whereby two etched printing surfaces each having a plurality of etched press printing portions are produced, each etched printing portion of one printing surface being positioned exactly to register with a corresponding etched portion on the other press printing surface.

7. The process of making a series of etched rolls the etched printing surfaces whereof are exactly registrable one with another, consisting in transferring a carbon tissue print comprising one or more representations to be finally printed to an etchable press-printing body, and in etching such body by use of a suitable acid; in taking an impression from such etched body on a transparent sheet; in assembling such impressioned sheet with a sheet of sensitized carbon tissue; in making from such assemblage a photographic carbon tissue print; and in transferring such carbon tissue print to another etchable press-printing body and etching the same by use of a suitable acid.

8. The process of making a series of etched press-printing bodies for use in multicolor printing, consisting in etching a master or key press-printing body with a complete representation of what is to be afterward press-printed in colors; in taking an impression from such key body on a transparent sheet in an ink or medium that will not print photographically, to form a key sheet; in flatwise assembling such key sheet with a transparent reproduction sheet and working thereon in a medium that will print photographically such portion of the key-sheet representation as is to be finally printed in a color other than that to be printed by the key press-printing body; in assembling the worked reproduction sheet with a sheet of sensitized carbon tissue and making a carbon tissue print by exposure to light; in transferring such exposed carbon tissue print to a press-printing body to be etched; and in etching it.

In testimony whereof I have hereunto set my hand this 25th day of April, 1916.

CHARLES W. SAALBURG.